United States Patent
Hashimoto

(10) Patent No.: US 7,590,869 B2
(45) Date of Patent: Sep. 15, 2009

(54) ON-CHIP MULTI-CORE TYPE TAMPER RESISTANT MICROPROCESSOR

(75) Inventor: Mikio Hashimoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 578 days.

(21) Appl. No.: 10/948,313

(22) Filed: Sep. 24, 2004

(65) Prior Publication Data
US 2005/0105738 A1    May 19, 2005

(30) Foreign Application Priority Data
Sep. 24, 2003  (JP) .......................... P2003-331143

(51) Int. Cl.
G06F 11/30    (2006.01)
(52) U.S. Cl. .................. 713/194; 713/189; 713/190; 380/228; 380/277; 712/32; 712/34
(58) Field of Classification Search ............... 713/194, 713/190; 380/228; 712/32, 34, 36, 42, 43
See application file for complete search history.

(56) References Cited

U.S. PATENT DOCUMENTS

| | | | |
|---|---|---|---|
| 6,546,465 B1 * | 4/2003 | Bertone | 711/144 |
| 6,983,366 B1 * | 1/2006 | Huynh et al. | 713/168 |
| 7,136,488 B2 * | 11/2006 | Hashimoto et al. | 380/277 |
| 2001/0014936 A1 * | 8/2001 | Jinzaki | 711/221 |
| 2001/0018736 A1 * | 8/2001 | Hashimoto et al. | 713/1 |
| 2002/0051536 A1 * | 5/2002 | Shirakawa et al. | 380/45 |
| 2002/0097878 A1 * | 7/2002 | Ito et al. | 380/277 |
| 2002/0152374 A1 * | 10/2002 | Mayfield | 713/153 |
| 2002/0178240 A1 * | 11/2002 | Fiveash et al. | 709/221 |
| 2003/0033537 A1 * | 2/2003 | Fujimoto et al. | 713/193 |
| 2003/0065933 A1 * | 4/2003 | Hashimoto et al. | 713/194 |
| 2003/0105830 A1 * | 6/2003 | Pham et al. | 709/216 |
| 2003/0105967 A1 * | 6/2003 | Nam | 713/189 |

(Continued)

FOREIGN PATENT DOCUMENTS

EP    121853 A2 * 10/1984

(Continued)

OTHER PUBLICATIONS

David Lie, et al: "Architectural Support for Copy and Tamper Resistant Software", (Proceedings of ASPLOS 2000), Nov. 2000.

(Continued)

*Primary Examiner*—Kimyen Vu
*Assistant Examiner*—April Y Shan
(74) *Attorney, Agent, or Firm*—Oblon, Spivak, McClelland, Maier & Neustadt, L.L.P.

(57) ABSTRACT

The on-chip multi-core type tamper resistant processor has a feature that, on the microprocessor package which has a plurality of instruction execution cores on an identical package and an ciphering processing function that can use a plurality of ciphering keys in correspondence to programs under a multi-task program execution environment, a key table for storing ciphering keys and the ciphering processing function are concentrated on a single location on the package, such that it is possible to provide a tamper resistant microprocessor in the multi-processor configuration that can realize the improved processing performance by hardware of a given size compared with the case of providing the key table and the ciphering processing function distributedly.

4 Claims, 9 Drawing Sheets

U.S. PATENT DOCUMENTS

| | | | |
|---|---|---|---|
| 2003/0126458 A1* | 7/2003 | Teramoto et al. | 713/194 |
| 2003/0133574 A1* | 7/2003 | Caronni et al. | 380/277 |
| 2003/0140205 A1* | 7/2003 | Dahan et al. | 711/163 |
| 2003/0182571 A1* | 9/2003 | Hashimoto et al. | 713/194 |
| 2003/0236919 A1* | 12/2003 | Johnson et al. | 709/251 |
| 2005/0166069 A1* | 7/2005 | Hashimoto et al. | 713/194 |

FOREIGN PATENT DOCUMENTS

| | | |
|---|---|---|
| JP | 59-186046 A | 10/1984 |
| JP | 2002-353960 A | 12/2002 |
| JP | 2003-108442 A | 4/2003 |

OTHER PUBLICATIONS

James Archibald, et al: "Cache Coherence Protocols: Evaluation Using a Multiprocessor Simulation Model", ACM Transactions on Computer Systems, vol. 4, No. 4, Nov. 1986, pp. 273-298.

U.S. Appl. No. 10/754,571, filed Jan. 12, 2004, Kensaku Yamaguchi, et al.

U.S. Appl. No. 10/391,618, filed Mar. 20, 2003, Mikio Hashimoto, et al.

U.S. Appl. No. 10/608,113, filed Jun. 30, 2003, Kensaku Yamaguchi, et al.

U.S. Appl. No. 10/434,082, filed May 9, 2003, Hiroshi Isozaki, et al.

U.S. Appl. No. 10/259,379, filed Sep. 30, 2002, Mikio Hashimoto, et al.

U.S. Appl. No. 10/214,197, filed Aug. 8, 2002, Kensaku Fujimoto, et al.

U.S. Appl. No. 10/059,217, filed Jan. 31, 2002, Mikio Hashimoto, et al.

U.S. Appl. No. 10/028,794, filed Dec. 28, 2001, Keiichi Teramoto, et al.

U.S. Appl. No. 09/984,717, filed Oct. 31, 2001, Mikio Hashimoto, et al.

U.S. Appl. No. 09/781,284, filed Feb. 13, 2001, Mikio Hashimoto, et al.

U.S. Appl. No. 09/781,158, filed Feb. 13, 2001, Mikio Hashimoto, et al.

U.S. Appl. No. 10/913,537, filed Aug. 9, 2004, Hashimoto et al.

U.S. Appl. No. 11/060,704, filed Feb. 18, 2005, Haruki et al.

U.S. Appl. No. 12/274,024, filed Nov. 19, 2008, Hashimoto, et al.

* cited by examiner

ON-CHIP MULTI-CORE TYPE TAMPER RESISTANT MICROPROCESSOR

BACKGROUND OF THE INVENTION

1. Field of the Invention

The present invention relates to a tamper resistant microprocessor which is capable of protecting secrets of program execution codes and processing target data and preventing illegal alteration by having an encryption processing function that can use a plurality of encryption keys in correspondence to programs under a multi-task program execution environment, in a multi-processor configuration which has a plurality of instruction processing functions on an identical package.

2. Description of the Related Art

The tamper resistant processor is a processor which has a mechanism for ensuring security of secrets of programs with respect to programs of multi-vendors, in a multi-task computer system (see Japanese Patent Application Laid Open No. 2001-318787, for example).

Also, the cache write back method in which the encryption key is selected independently from the currently executed execution control unit (ECU ID) is disclosed in detail by the present inventor and the others (see Japanese Patent Application Laid Open No. 2003-108442, for example).

On the other hand, in the case of using a common hardware for the encryption/decryption processing, there is a need to produce an encryption work key and a decryption work key from a key according to the specification additionally (see Japanese Patent Application Laid Open No. 2000-66586, for example). For instance, in the case of the AES cryptosystem according to the Advanced Encryption Standard (AES), the encryption work key is defined as a key according to the specification, and there is a need to obtain the decryption work key by an expansion operation on the encryption work key (see the home page of the computer security resource center of NIST (National Institute of Standards and Technology at http://csrc.nist.gov/).

When the system has a single processor (uni-processor), the security of the data on a cache can be guaranteed by the cache control scheme of the above described prior art. Also, there is a proposition of the control scheme for guaranteeing the consistency of the cache as well as the security even in the case of multi-processors in an independent package.

The multi-processor configuration includes an on-chip multi-core type configuration which has a plurality of processor cores in an identical package, but no on-chip multi-core type configuration has been known conventionally for the tamper resistant processor having the encryption function.

In realizing the tamper resistant processor, the major difference between the independent package type multi-processor configuration and the on-chip multi-core type multi-processor configuration is whether the bus for connecting between processors is provided at external of the processor package or internal of the processor package. In the case where the bus is provided at internal of the processor package, the reading information that flows through the package internal bus is impossible for the general users who do not have an LSI analyzing equipment.

BRIEF SUMMARY OF THE INVENTION

It is therefore an object of the present invention to provide a tamper resistant processor in the multi-processor configuration which has a plurality of instruction processing functions on an identical package.

It is another object of the present invention to provide a tamper resistant microprocessor which is capable of protecting secrets of program execution codes and processing target data and preventing illegal alteration by having an encryption processing function that can use a plurality of encryption keys in correspondence to programs under a multi-task program execution environment.

According to one aspect of the present invention there is provided a tamper resistant microprocessor package, comprising: a plurality of processors capable of executing programs in parallel; and a bus interface unit connected with the plurality of processors through an internal bus and having: a key table provided with respect to the plurality of processors, configured to store keys corresponding to the programs; and an encryption/decryption processing unit provided with respect to the plurality of processors, configured to read out a requested memory data from an external memory and decrypt a read out memory data by using a key corresponding to a currently executed program stored in the key table in response to a memory reading request from a currently executed program, and encrypt data to be written into the external memory by using a key corresponding to a currently executed program stored in the key table and transfer encrypted data to the external memory in response to a memory writing request from a currently executed program.

Other features and advantages of the present invention will become apparent from the following description taken in conjunction with the accompanying drawings.

DETAILED DESCRIPTION OF THE INVENTION

Figure 1:
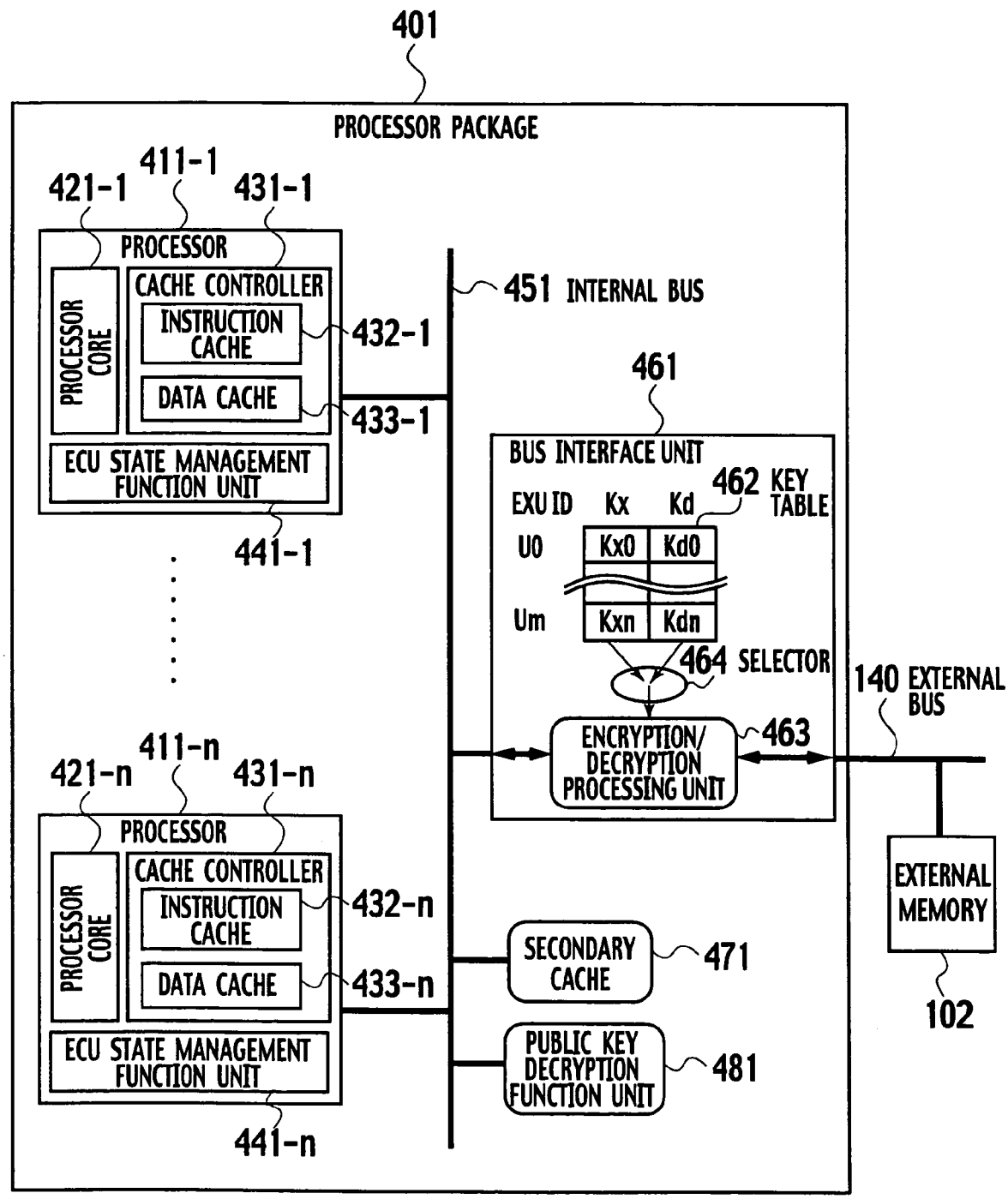
FIG. 1 is a block diagram showing an internal configuration of the on-chip multi-core type tamper resistant processor according to one embodiment of the present invention.

The on-chip multi-core type tamper resistant processor of this embodiment has a feature that, on the microprocessor package which has a plurality of instruction execution cores on an identical package and an encryption processing function that can use a plurality of encryption keys in correspondence to programs under a multi-task program execution environment, a key table for storing encryption keys and the encryption processing function are concentrated on a single location on the package, such that it is possible to provide a tamper resistant microprocessor in the multi-processor configuration that can realize the improved processing performance by hardware of a given size compared with the case of providing the key table and the encryption processing function distributedly. As a result, it becomes possible to protect secrets of program execution codes and processing target data and prevent illegal alteration.

Referring now to FIG. 1 to FIGS. 9A and 9B, one embodiment of the on-chip multi-core type tamper resistant microprocessor according to the present invention will be described in detail. In the drawings, the identical or similar portions are given the identical or similar reference numerals.

(Basic Technology)

Figure 2:
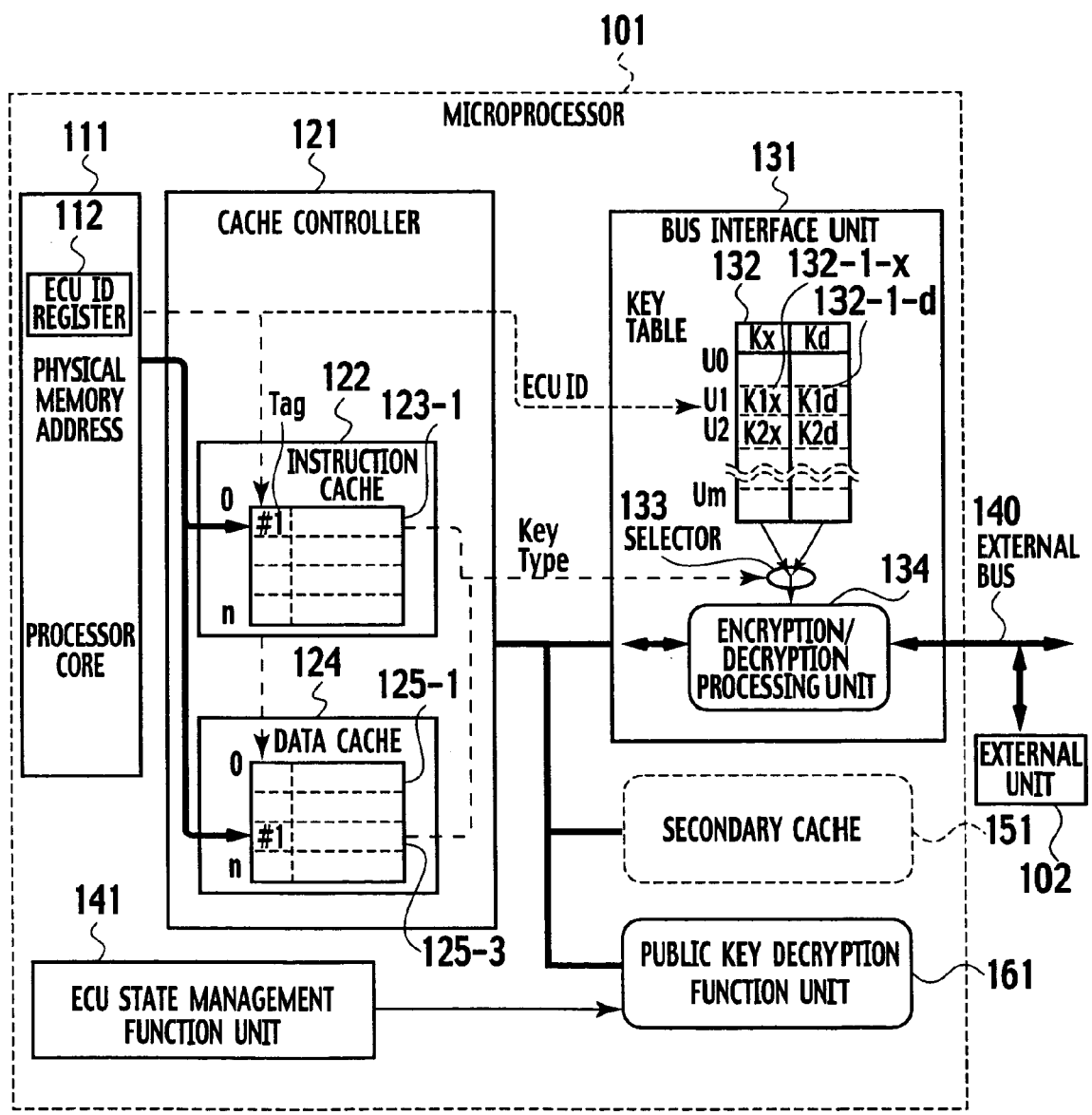
FIG. 2 is a block diagram showing a basic internal configuration of a tamper resistant processor.

FIG. 2 shows a basic form of the tamper resistant processor, which operates as follows. The tamper resistant processor protects secrets of programs of the multi-vendors by a processor hardware under the management of the multi-task OS. On an assumption that the OS is not necessarily trustworthy, the tamper resistant processor provides a secret protection function for programs that can be completed by the hardware function of a single processor package.

The programs are managed by the OS as processes at a time of execution. The execution of programs in the tamper resistant processor hardware is carried out in units of processes similarly as in the case of the ordinary OS. The major differences are that a part of the process information that is conventionally managed by the OS is directly managed by the processor hardware, and that the encryption processing of programs themselves is carried out by the hardware.

In the proper process execution, the management of the process information by the OS and the processor should be carried out consistently, but when a malicious OS or bugged OS is assumed, it is necessary to assume that the discrepancy occurs in the process information managed by the OS and the processor. In the following, the process managed by the tamper resistant processor hardware will be referred to as an execution control unit (ECU) in order to clearly distinguish the management of the process information by the OS and the management of the process information by the processor.

The tamper resistant processor can execute a plurality of ECUs in a pseudo parallel manner in order to support the multi-task environment. On the processor, the ECU is uniquely identified by an ECU ID. In FIG. 2, there are a processor core 111 and an ECU ID register 112 for holding the currently executed ECU ID. There is also a cache controller 121, which internally has an instruction cache (I cache) 122 and a data cache (D cache) 124. The instruction cache 122 and the data cache 124 respectively have an instruction cache memory 123 and a data cache memory 125, and each cache memory is formed by cache lines 123-1 to 123-n or 125-1 to 125-n. Each cache line has a tag field and a data field.

Figure 7:
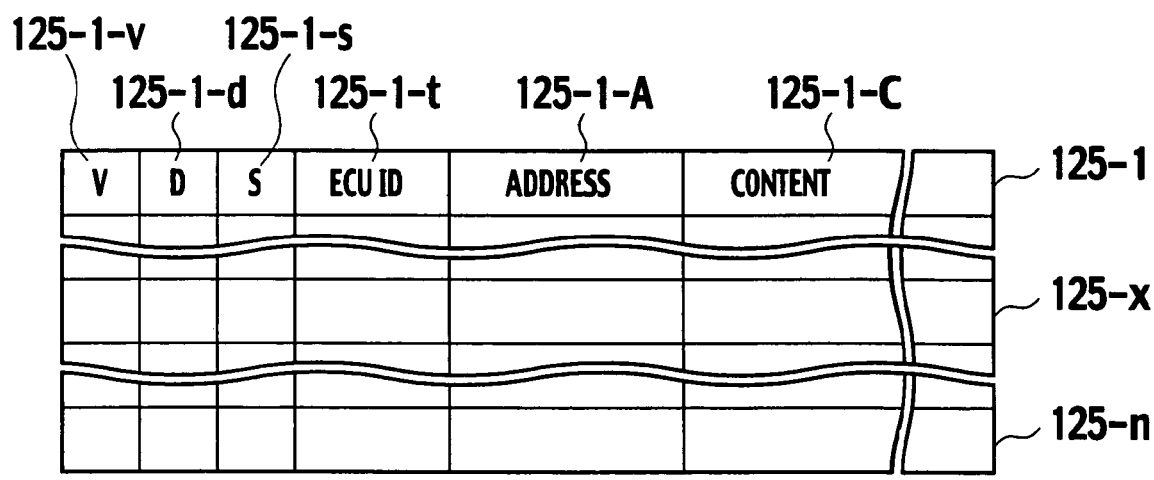
FIG. 7 is a diagram showing a cache data structure used in the tamper resistant processor of FIG. 2.
Figure 8:
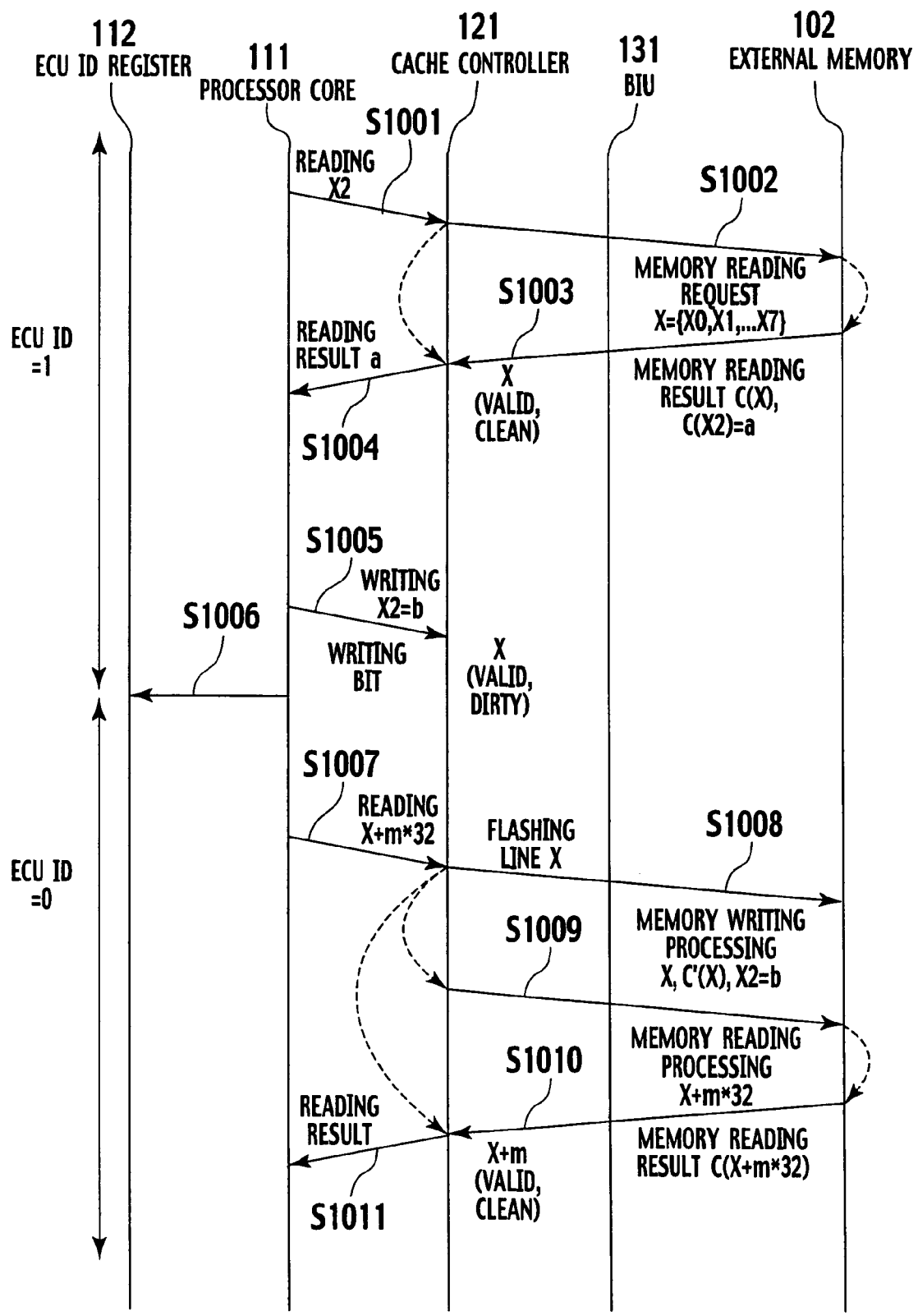
FIG. 8 is a sequence chart showing an operation sequence of the tamper resistant processor of FIG. 2, which is a cache access sequence for a uni-processor.

FIG. 7 shows a detail of the data cache memory 125. The cache line 125-1 to 125-n is largely divided into a tag and a content. The tag has a control bit field, an ECU ID field, and an address field. For the cache line 125-1, the control bit field includes a valid field 125-1-v for indicating valid/invalid of the cache line, a dirty field 125-1-d for indicating presence/absence (dirty/clean) of an update of the cache content that has not been written into an external memory 102, and a share field 125-1-s for indicating presence/absence (shared/exclusive) of a state of sharing the cache line with the other processor. There are also the ECU ID field 125-1-t, the address field 125-1-A and the cache content 125-1-C.

Returning now to FIG. 2, there is also a bus interface unit (BIU) 131 which carries out input/output with respect to the external of the processor. The BIU 131 has a key table 132, a selector 133, and an encryption/decryption processing unit 134. The key table 132 has m+1 sets of entries 132-0 to 132-m. These entries are provided in correspondence to ECUs, and each entry has two fields for a program encryption key (program key) Kx and a data encryption key (data key) Kd. There are also an ECU state management function unit 141, a secondary cache 151, and a public key decryption function unit 161. In the following, an exemplary case of executing a certain program P as a process p, by referring to FIG. 2. Here, it is assumed that the process p is allocated with ECU ID #1.

(Execution of Encryption Processing)

On the external memory 102, the program P is encrypted by a prescribed encryption key Kx as KxP. This key can be set up individually for each program by a program supplier. When the program is to be executed as the ECU (process), the OS allocates the ECU ID and one entry of the key table 132 corresponding to the ECU ID, to the process. Once the ECU ID is allocated, the key table entry for the ECU is managed by the processor so that it cannot be freely rewritten even by the OS. In the following, the key to be used for the encryption or decryption will be referred to as the ciphering key in either case, for the encryption/decryption of the secret key algorithm.

On the external memory, KxP is provided in an encrypted form X obtained by using the processor public key Kp. When the ECU ID is to be allocated to the process, the OS issues a key registration special instruction using the ECU ID to be allocated (which is assumed to be #1 here) and an address of X as parameters. By the execution of the key registration special instruction, the ECU state management function unit 141 and the public key decryption function unit 161 of the processor hardware decrypts X by using a processor secret key. For the decrypted result KxP, the encryption key is written into an entry 132-1-1 of the key table 132 corresponding to the ECU ID #1 by the hardware. Except for the issuance of the key registration special instruction by the OS, this procedure is processed by the processor hardware so that the OS cannot interfere with this procedure. By the writing of the key value into the key table entry corresponding to the ECU ID, the ECU ID #1 becomes an executable state.

At a time of starting the execution of the process p, i.e., ECU of ECU ID #1, the OS issues an execution start instruction which is a special instruction, by specifying the ECU ID #1. In response, #1 is written into a current task register (ECU register) 112 of the processor core 111, and thereafter the instruction sequence decrypted by the key in the entry 132-1-x, i.e., K0, specified by this current task register 112, rather than the encrypted instruction stored in the external 102, will be stored into the cache memory and executed at a time of the instruction reading in the program execution for ECU ID #1.

Note that the non-encryption processes including the OS are allocated with ECU ID #0, and the following encryption processing will not be carried out when the value of the current task register 112 is #0. The current task ID is #0 in a state where the OS is executed before the start of the process p.

In the execution of the encrypted program, when the memory content of the address of X is read by the instruction fetch as a result of the execution of ECU ID #1, the BIU 131 reads out the memory content of the encrypted instruction sequence corresponding to the address of X. Then, it is decrypted by using the decryption key K0 in the entry 132-0-x for the program specified by the currently executed ECU ID #1 and stored into the cache line 123-1.

The processor core 111 takes out the decrypted instruction sequence from the cache line 123-1 and execute it sequentially.

(Interrupt/resume, Prohibiting Other Tasks from Referring to a Protected Line)

When the process execution is interrupted by the interruption, the register information of the currently executed ECU is encrypted and saved into a memory, and a control is shifted to a prescribed interruption handler. When the control is shifted to the interruption handler, the value of the current task register (ECU ID register) 112 is set back to the value #0 indicating the non-encryption.

The decrypted instruction sequence is still held in the cache line 123-1 even while the execution of the EDU ID #1 is interrupted. However, even if the OS or the other process tries to refer to this cache line by the instruction fetch, the EDU ID value (#1) of the cache tag and the currently executed ECU ID value (≠#1) do not coincide in the cache hit judgment, so that the OS or the other process cannot execute the already decrypted instruction in the cache line, such that EDU ID #1 is isolated from the other ECUs.

When the interruption processing is completed, the process p is scheduled again and the dispatch is to be carried out, the execution resume instruction for the EDU ID #1 is issued. When the execution resume instruction is issued, the ECU ID is set back to #1, the saved context information is read into the register and the program counter is recovered, the control is shifted to the address before the execution interruption, and the process is resumed.

(Data Encryption)

The processor can carry out the encryption processing not only for programs but also for data. In the case of data, the difference from the case of instruction is that there is an encryption processing at a time of writing, in addition to a decryption processing at a time of reading. In the following, a key to be used for the data processing will be referred to as a data key. The data key for the ECU ID #1 is stored in the entry 132-1-d. Similarly as the initialization of the instruction key, the data key value can be set at a time of the start of the process, or can be set during the execution of the process. Here, it is assumed that the value is set at a time of the initialization of the instruction key. In the following, the data processing will be described with reference to FIG. 8.

The processor core 111 issues a word reading request for address X2 to the cache controller 121 (step S1001).

The data cache 124 judges whether the cache for address X2 exists or not. Here the content of address X2 is not cached, so that the cache controller 121 issues a memory reading request for address range X to X+31 that contains an address X2, to the external memory 102 through the BIU 131 (step S1002).

The reading of data for ECU ID #1 from the external memory 102 is carried out in units of cache lines similarly as in the case of instruction. When there is a data reading request for a memory of address X from the processor core 111, the current ECU ID #1 is notified from the cache to the BIU 131. The content of the cache data C(X) corresponding to address X which is read out from the external memory 102 is decrypted by the data key K1d in the entry 132-1-d specified by the current task register 112, the decrypted result is stored into the cache line 125-x, and ID #1 is written into the tag (step S1003).

The processor core 111 reads the memory content of cache data C(X2)=a of the requested address from the cache line 125-x, and stores it into the entry 125-x-C (step S1004).

In the state where the content is read from the external memory 102, a state of the dirty bit 125-x-d of the tag of this cache line 125-x is "clean". In the case of data, there is also the writing. When there is a data writing from the processor core 111, the data is written into the cache if it is a cache hit for a target address (step S1005).

Here, the cache write back algorithm is adopted so that the changed data will not be written back to the external memory 102 immediately. A state of the dirty bit 125-x-d of the cache line to which the writing is made becomes "dirty".

(Data Write Back)

When the cache line is flashed and to be written back, the encryption is carried out. The data are encrypted by using the data key specified by the currently executed ECU ID, and written into a prescribed address in the external memory 102. In this example, there is a conflict for the cache line 125-x in which the content of address X is held. When the reading request for address X+m*32 is issued from the processor core 111 (step S1007), the write back of the cache line 125-x starts.

Prior to the data writing, the data encryption is carried out. The cache tag 125-x-t that stores ECU ID at a time of reading this cache line 125-x is referred and ECU ID #1 is taken out by the cache controller 121. Then, the value of the key K1d stored in the field of the entry 132-1-d corresponding to ECU ID #1 which is the data key in the key table 132 is read out by the BIU 131, and the cache data is encrypted by using the key K1d. The encrypted data are written back to address X in the external memory 102 (step S1008).

Note that there are cases where ECU ID of the cache line 125-x and the current ECU ID are different at this point. In this example, the current ECU ID is changed to #0 at the step S1006, so that ECU ID used for specifying the encryption key at a time of the cache line write back does not coincide with the current ECU ID. One that used for specifying the encryption key at a time of the write back is ECU ID at a time of reading the cache line 125-x in which is stored in the cache tag.

When the write back of the data remained in the writing target line is finished, the memory reading of address X+m*32 that has been interrupted is resumed (step S1009).

In this case, the decryption processing at a time of the memory reading is not carried out because ECU ID is #0, and the filling of the cache line 125-x is completed by directly storing the value read from the external memory 102 into the data cache memory 125 (step S1010). Then, the word of address requested by the processor core is read from the cache line (step S1011).

(Access Conflict Control Between Processes with Respect to Data on Cache)

When data in the decrypted state exists in the cache line 125-x, there can be cases where it is accessed by the other process, similarly as in the case of instruction. In the case of data, similarly as in the case of instruction, ECU ID recorded in the tag of the access target cache line and the current ECU ID are compared, and this cache line is flashed if they do not coincide, so that the plaintext data read by the process p is isolated and protected from the other process.

By this mechanism, the isolation and protection of information for each one of softwares provided by different vendors is guaranteed in the tamper resistant processor system, even under the management of the malicious OS.

(Bus Connected Independent Type Multi-processor)

Figure 3:
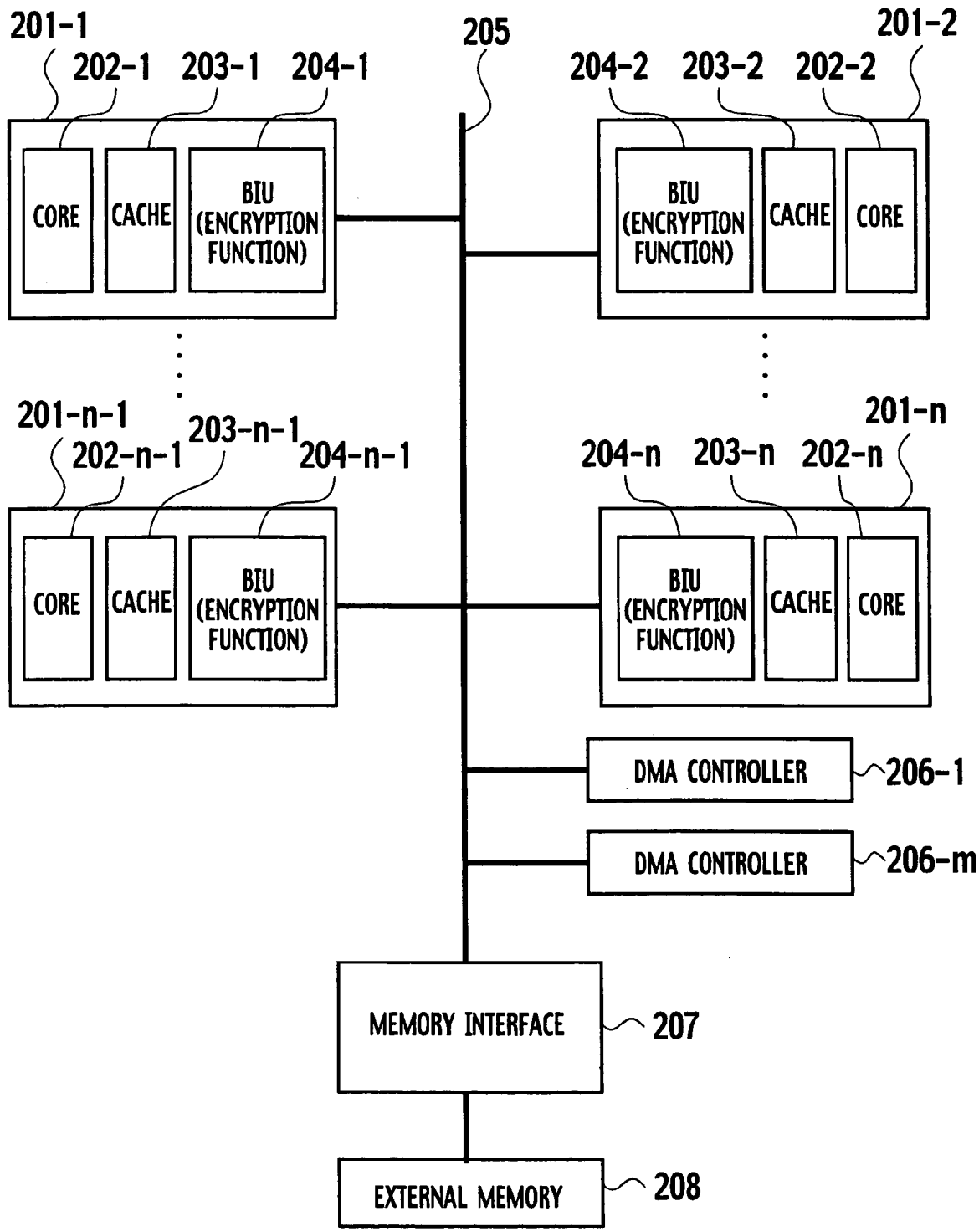
FIG. 3 is a block diagram showing a configuration of a bus connected independent type tamper resistant processor.

As shown in FIG. 3, the processor system has a system bus line 205, a memory interface 207 connected to the system bus line 205, an external memory 208 connected to the system bus line 205 via the memory interface 207, a plurality of processors 201-1 to 201-n, and DMA controllers 206-1 to 206-m connected to the system bus line 205. This system is configured as a multi-processor system of the tamper resistant processor, and the individual processor internally contains a processor core 202-1 to 202-n, a cache 203-1 to 203-n, and a BIU 204-1 to 204-n which has the encryption function. In FIG. 3, elements 201, 202, 203 and 204 correspond to elements 101, 111, 121 and 131 of FIG. 2 respectively.

The multi-processor configuration of FIG. 3 is often employed for the purpose of improving the system performance. Each one of the processors 201-1 to 201-n is a processor of an independent package which has the encryption function, and they are connected through the system bus line 205. In the system of the multi-processor configuration in which each processor independently has a cache, the cache consistency control protocol is used in order to guarantee the consistency of the data caches. In the cache consistency control protocol, messages for establishing synchronization of the data are exchanged between the individual processors, so as to maintain the consistency of the data caches. Here, from a viewpoint of the individual processor, there is a need to carry out the input/output control for the local cache data according to messages from the external. In the cache consistency control scheme of the tamper resistant processor, each one of the processors 201-1 to 201-n shown in FIG. 3 has one processor core 202-1 to 202-n, and each processor package is made to be a tamper resistant processor having the encryption function, so as to resolve the problem arising when they are connected through the system bus line 205.

In general, in such a multi-processor configuration in which each processor package independently has a cache, when one processor updates the cache data locally, there is a need for the cache consistency control in order to reflect that update information in the caches of the other processors, and the cache consistency control scheme in the tamper resistant processor described above is the cache consistency control scheme for the case where each processor is operated independently.

(Simple Exemplary Configuration)

Figure 4:
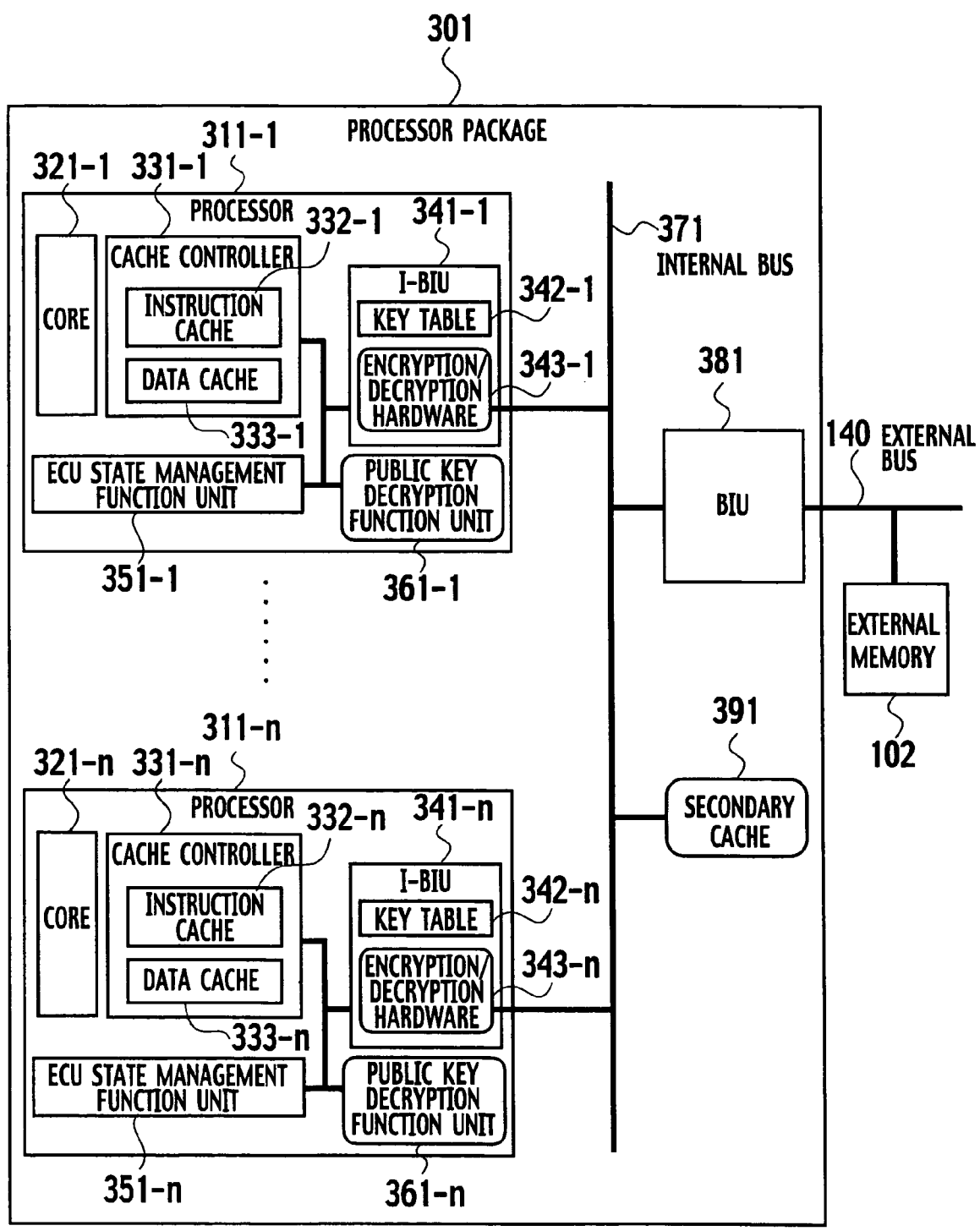
FIG. 4 is a block diagram of a simple on-chip multi-core type tamper resistant processor system.

FIG. 4 shows an exemplary case of simply applying the independent tamper resistant processor shown in FIG. 2 to the on-chip multi-core type multi-processor configuration. In the following, this exemplary case will be referred to as a simple exemplary configuration. A processor package 301 shown in FIG. 4 has processors 311-1 to 311-n which are provided on the chip. The processor 311-1 has a processor core 321-1, a cache controller 331-1, an instruction cache 332-1, a data cache 333-1, an internal BIU (I-BIU) 341-1, a key table cache 342-1, an encryption/decryption hardware 343-1, an ECU state management function unit 351-1, and a public key decryption function unit 361-1. The processor package 301 also has an internal bus 371, a BIU 381, and a secondary cache 391.

Figure 5:
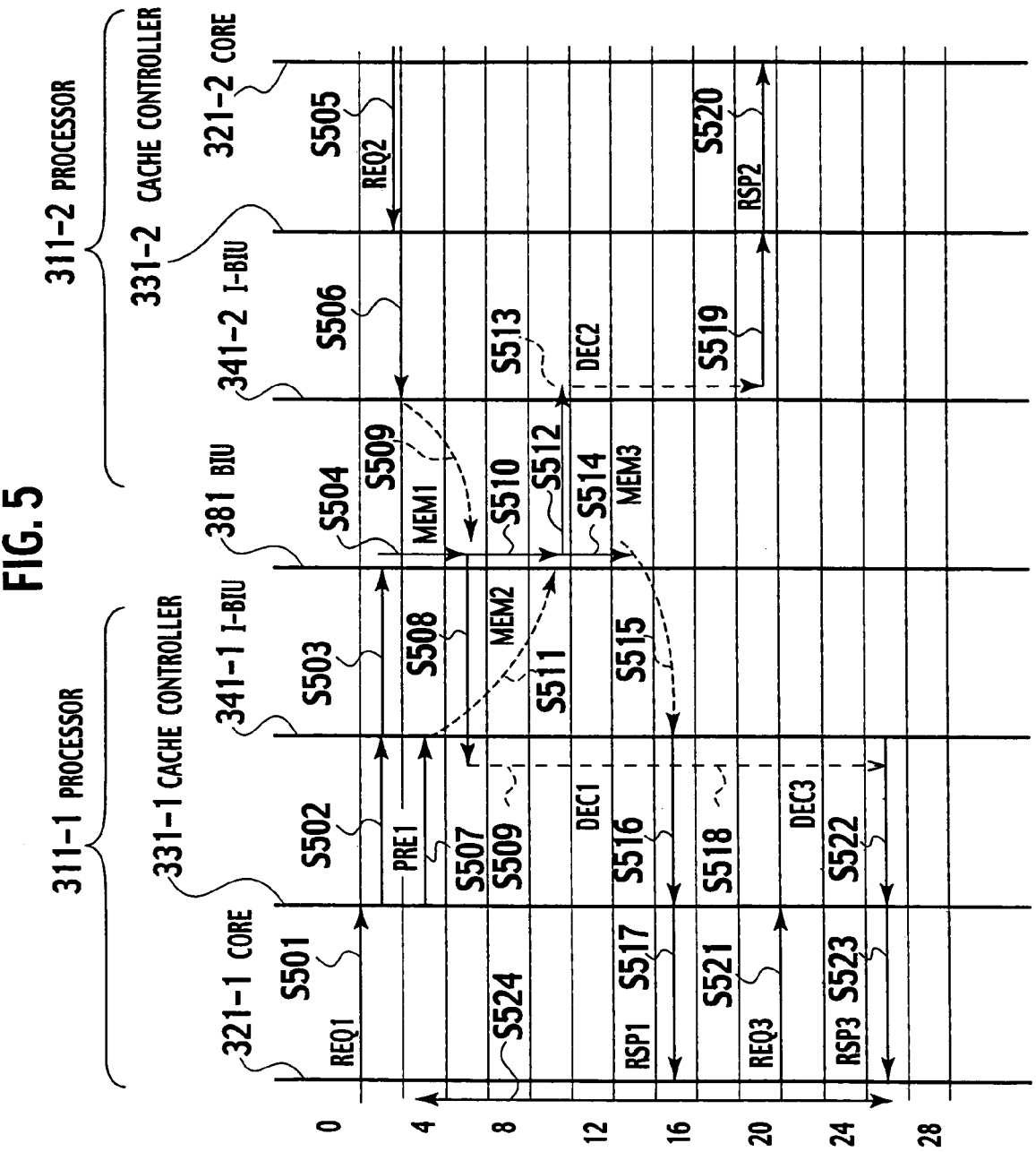
FIG. 5 is a sequence chart showing an operation sequence of the simple on-chip multi-core type tamper resistant processor system of FIG. 4.

FIG. 5 shows a memory access operation sequence by two processors in the simple exemplary configuration. In FIG. 5, horizontal dashed lines are depicted in every 2 clocks. Here, the memory referring operation sequence requires 4 clocks and a decryption processing operation sequence requires 10 clocks.

The processor core 321-1 of the processor 311-1 issues a memory referring request REQ1 to the cache controller 331-1 (step S501). In the case of the cache hit, the referring request is given to the I-BIU 341-1 after one clock (step S502) and further transferred to the BIU 381 (step S503), and the memory referring MEM1 is carried out (step S504).

During this operation, the processor core 321-2 of the processor 311-2 similarly issues a memory referring request REQ2, one clock after the memory referring request REQ1 (step S505). The request to the BIU 381 is issued at the step S509 but the execution of the memory referring is scheduled to be after the processing of the memory referring MEM1.

In addition, a prefetch request PRE1 is issued from the cache controller 331-1 of the processor 311-1, two clocks after the step S502 (step S507). The processing of the prefetch request PRE1 is scheduled to be after the step S509.

When the memory referring MEM1 is completed, the result is sent to the I-BIU 341-1, and the decryption processing DEC1 is started (step S509). At the BIU 381, the queued memory referring MEM2 is started (step S510).

When the memory referring MEM2 is completed, similarly the result is sent to the I-BIU 341-2 of the processor 311-2, and the decryption processing DEC2 is started (step S513). At the BIU 381, the queued memory referring MEM3 for the processor 311-1 is started (step S514).

When the decryption processing DEC1 at the processor 311-1 is completed, the result is sent to the cache controller 331-1 (step S516), and a memory referring response RSP1 is returned to the processor core 321-1 (step S517). The memory referring MEM3 is already completed at the same time as the completion of the decryption processing DEC1 (step S515), and the decryption processing DEC3 for this memory referring result is started (step S518). Here, there is a delay of two clocks since the referring result for the memory referring MEM3 is obtained until the decryption processing DEC3 is started.

When the decryption processing DEC2 at the processor 311-2 is completed, the result is returned to the processor core 321-2 as a memory referring response RSP2 (step S520). At the processor 311-1, a memory referring request REQ3 is issued after the memory referring response RSP1 (step S521), and when the decryption processing DEC3 is completed, the result is returned to the processor core 321-1 as a memory referring response RSP3 (step S523).

The delay since the prefetch PRE1 at the step S507 until the memory referring result is returned becomes 6 clocks for waiting finish of MEM1 and MEM2+4 clocks for waiting finish of MEM3 itself+2 clocks for waiting finish of DEC1+10 clocks for the processing delay of DEC3 itself=22 clocks (step S524).

Note that the key to be used in decrypting the memory reading result at the I-BIU 341 in response to the memory referring requests of the steps S503 and S509 will be selected according to an ECU number and a type in the writing request signal for each memory referring request.

At a time of returning the reading result from the BIU 381 to the I-BIU 341-1 or 341-2, the reading result is sent to the request source processor according to a processor number in the writing request signal for each memory referring request sent at the step S503 or S509. By using this signal format which has a key identifier formed by the ECU number and the type, and the processor number of the request source, it becomes possible to realize the encryption key selection and the sending of the memory referring result to the request source, even in the on-chip multi-core type tamper resistant processor.

(Pipeline Processing)

Figure 6:
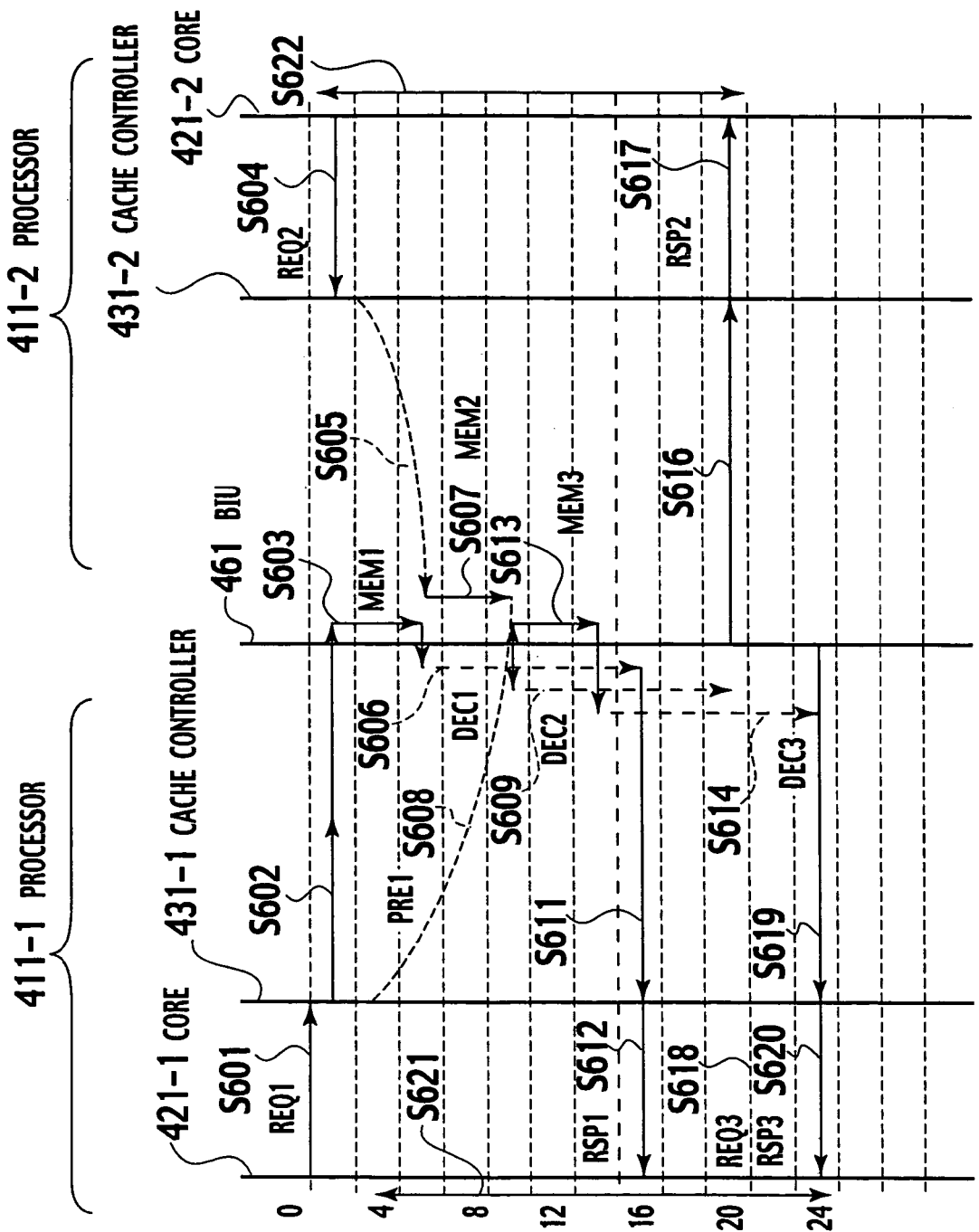
FIG. 6 is a sequence chart showing an operation sequence of the on-chip multi-core type tamper resistant processor of FIG. 1.

Next, another configuration of the on-chip multi-core type tamper resistant processor according to this embodiment and its operation will be described with references to FIG. 1 and FIG. 6.

A processor package 401 shown in FIG. 1 has processors 411-1 to 411-n which are provided on the chip. The processor 411-1 has a processor core 421-1, a cache controller 431-1, an instruction cache 432-1, a data cache 433-1, and an ECU state management function unit 441. In this configuration, the encryption processing function is integrated in one BIU 461 provided on the package, which has a key table 462, an encryption/decryption processing unit 463, and a selector 464 which has a key selection function for selecting a key to be used at the encryption/decryption processing unit 463 in response to a request from the cache. Here, only one encryption/decryption processing unit 463 is provided in the processor package 401, but it has a pipeline processing capability which can accept another request during the processing of the data. The processor package 401 also has an internal bus 451, a secondary cache 471, and a public key decryption function unit 481.

Figure 9A:
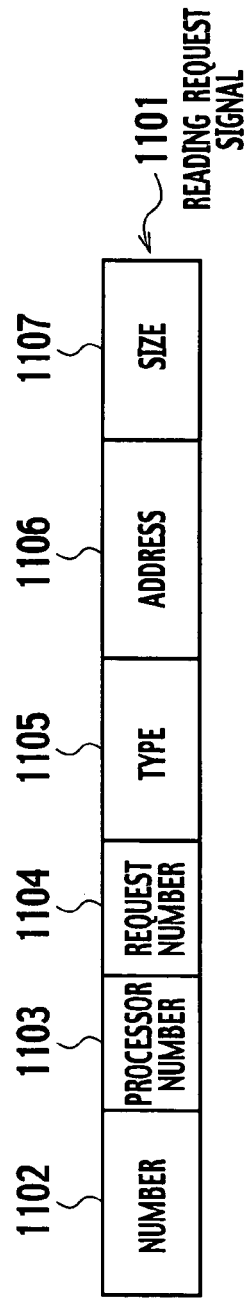
FIGS. 9A and 9B are diagrams showing formats of a reading request signal and a writing request signal used in the on-chip multi-core type tamper resistant processor of FIG. 1.
Figure 9B:
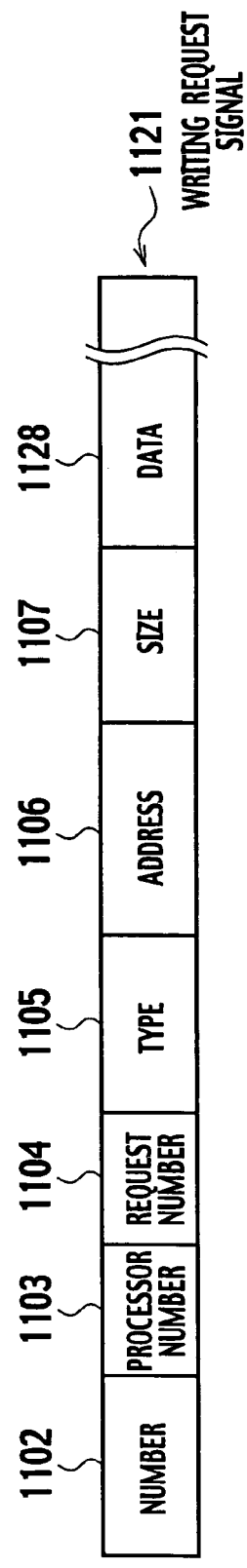

FIGS. 9A and 9B show formats of a reading request signal 1101 and a writing request signal 1121 which are issued from the processors 411-1 to 411-n through the internal bus 451 to the BIU 461 at a time of referring to the memory in this embodiment. An ECU number 1102 of the reading request stores ECU ID at a time this memory referring occurs, and BIU 461 selects the key to be used for the decryption processing from the key table according to this value. In other words, the ECU ID 1102 functions as a key identifier in the internal signal. Then, a processor number 1103 indicates the processor number of the request source processor, a request number 1104 indicates a request number assigned by each request source processor, a type 1105 indicates a distinction between program and data, an address 1106 indicates a reading address, and a size 1107 indicates a reading size. Among these, the processor number 1103 does not exist in the case of the uni-processor configuration.

To be exact, the key selection by the BIU 461 is carried out by using both the ECU number 1102 and the type 1105, so that a combination of these two functions as the key identifier in the internal bus signal. The format of the writing request signal 1121 are similar to the reading request signal except that it also includes a writing data 1128.

In the following, the operation in this embodiment will be described with reference to FIG. 6. This is a memory access operation by two processors similarly as in the case of the simple exemplary configuration, where the requests REQ1 to REQ3 are issued at the same timings as in FIG. 5, and the memory referring operation sequence requires 4 clocks and a decryption processing operation sequence requires 10 clocks similarly as in FIG. 5. The difference that affects the processing time is that the decryption processing to be carried out by the BIU 461 is carried out as the pipeline processing. Besides that the configuration is different in that there is no I-BIU.

The processor core 421-1 of the processor 411-1 issues a memory referring request REQ1 to the cache controller 431-1 (step S601). In this case, it is hit miss at the cache controller 431-1, so that the referring request is given to the BIU 461 after one clock (step S602), and the memory referring MEM1 is carried out (step S603). Each one of the memory referring requires 4 clocks.

During this operation, the processor core 421-2 of the processor 411-2 similarly issues a memory referring request REQ2, one clock after the memory referring request REQ1 (step S604). The request to the BIU 461 is issued at the step S605 but the execution of the memory referring is scheduled to be after the processing of the memory referring MEM1.

In addition, a prefetch request PRE1 is issued from the cache controller 431-1 of the processor 411-1, two clocks after the step S602 (step S608). The processing of the prefetch request PRE1 is scheduled to be after the memory referring MEM2.

When the memory referring MEM1 is completed, the decryption processing DEC1 of the referring result is started at the encryption/decryption processing unit 463 (step S606). At the same time, the queued memory referring MEM2 is started (step S607).

When the memory referring MEM2 is completed, similarly the decryption processing DEC2 is started (step S609). At this point, the decryption processing DEC1 is not completed yet, but the encryption/decryption processing unit 463 has the pipeline processing capability so that the next data can be processed. Also, the queued memory referring MEM3 for the processor 411-1 is started (step S613).

When the decryption processing DEC1 is completed, the result is sent to the cache controller 431-1 (step S611), and a memory referring response RSP1 is returned to the processor core 421-1 (step S612). The memory referring MEM3 is already completed before the completion of the decryption processing DEC1, and the decryption processing DEC3 for this memory referring result is started (step S614).

When the decryption processing DEC2 is completed, the result is returned to the processor core 421-2 as a memory referring response RSP2 (step S617).

At the processor 411-1, a memory referring request REQ3 is issued after the memory referring response RSP1 (step S618), and when the decryption processing DEC3 is completed, the result is returned to the processor core 421-1 as a memory referring response RSP3 (step S620). Here, the delay times for the memory referring response RSP1 and RSP2 with respect to the memory referring requests REQ1 and REQ2 by the processors 411-1 and 411-2 are the same as in the simple exemplary configuration.

However, the delay since the prefetch PRE1 at the step S608 until the memory referring result is returned becomes 6 clocks for waiting finish of MEM1 and MEM2+4 clocks for waiting finish of MEM3 itself+10 clocks for the processing delay of DEC3 itself=20 clocks (step S621), so that the waiting time can be shortened by two clocks compared with the case of the simple exemplary configuration, as much as that required for waiting finish of the decryption processing D1.

In this embodiment, an exemplary case of using two processors and only one prefetch request from the processor 411-1 has been described, but when the number of processors is increased and the prefetch request is issued from each processor core, the effect of shortening the waiting time by applying this embodiment becomes more prominent, and the performance can be improved further.

This effect becomes more prominent when there are more relevant processors and a frequency of consecutive memory referring such as the memory referring request REQ1 and the prefetch request PRE1 is higher.

In general, when the pipeline processing is applied to a block encryption processing circuit in 10 stage configuration which has a delay of 10 clocks, its circuit scale becomes 10 times larger, but by concentrating the circuit, it can be expected to become smaller than 10 times by eliminating the overhead of the overlapping portions.

Consequently, in the case of the on-chip multi-core type processor package having 10 cores, the circuit scale required in the case of providing one encryption hardware with the pipeline function as in this embodiment is equivalent or smaller compared with the case of the simple exemplary configuration in which the encryption hardware without the pipeline function is provided for each one of 10 cores. Under this hardware condition, the configuration of this embodiment can suppress the delay of the memory decryption processing smaller so that there is an effect of improving the performance, as described above. In addition, the simple exemplary configuration requires the key table in each processor, but the configuration of this embodiment can converge the key table into one so that there is an effect of suppressing the hardware scale in this regard as well.

As described, according to the present invention, by concentrating the encryption processing unit on a single location with respect to a plurality of processor cores on the package in the on-chip multi-core type tamper resistant processor, it is possible to reduce the delay at a time of the memory access and improve the processing performance, compared with the case of providing the encryption processing unit in correspondence to each processor core in the hardware of the same scale. Namely, because the average memory access delay value can be suppressed below a certain value, the hardware scale can be made smaller and the cost of the processor package can be lowered.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A tamper resistant microprocessor package, comprising:
   a plurality of processors capable of executing programs in parallel; and
   a single bus interface unit connected with all of the plurality of processors through an internal bus and having:
   a common key table shared by all of the plurality of processors, configured to store keys corresponding to the programs; and
   a single encryption/decryption processing unit provided with respect to all of the plurality of processors, and connected with the common key table, wherein
   the single encryption/decryption processing unit is configured to, in response to a memory reading request from a first currently executed program, read out a requested memory data from an external memory outside the tamper resistant microprocessor package and decrypt the requested memory data by using a first key corresponding to the first currently executed program and also stored in the single key table, and
   the single encryption/decryption processing unit is also configured to, in response to a memory writing request from a second currently executed program, encrypt a non-encrypted data to be written into the external memory by using a second key corresponding to the second currently executed program and also stored in the single key table and transfer encrypted data to the external memory.

2. The tamper resistant microprocessor package of claim 1, wherein the common key table stores each key corresponding to each program which is shared by the plurality of processors.

3. The tamper resistant microprocessor package of claim 1, wherein the single encryption/decryption processing unit is configured to carry out encryption/decryption processing by a pipeline processing.

4. The tamper resistant microprocessor package of claim 1, wherein the single bus interface unit is configured to receive the memory reading request and the memory writing request which contain a processor identifier for identifying a request source processor and a key identifier for uniquely identifying an entry of the single key table.

* * * * *